United States Patent [19]

Suzuki et al.

[11] Patent Number: 4,848,205
[45] Date of Patent: Jul. 18, 1989

[54] CIRCULAR SAW BLADE

[75] Inventors: Yoshimitu Suzuki; Masahiro Inagaki, both of Nagoya, Japan

[73] Assignee: Takekawa Iron Works, Japan

[21] Appl. No.: 132,787

[22] Filed: Dec. 10, 1987

[30] Foreign Application Priority Data

Jan. 12, 1987 [JP] Japan .................. 62-3222[U]

[51] Int. Cl.$^4$ .................. B23D 61/02; B27B 33/08
[52] U.S. Cl. .................. 83/853; 83/835; 83/839
[58] Field of Search .................. 83/853, 835, 838, 839, 83/840

[56] References Cited

U.S. PATENT DOCUMENTS

| 151,371 | 5/1874 | Emerson | 83/853 X |
| 192,090 | 6/1877 | Spaulding | 83/853 |
| 2,565,814 | 8/1951 | Haycock | 83/853 |
| 2,972,364 | 2/1961 | Standal | 83/853 |
| 3,788,182 | 1/1974 | Tyler | 83/835 |

Primary Examiner—Frank T. Yost
Assistant Examiner—Rinaldi Rada
Attorney, Agent, or Firm—Darby & Darby

[57] ABSTRACT

A circular saw blade which comprises a circular main body, and a plurality of circumferentially spaced cutter tips secured to said main body, each of the cutter tips having a front surface whose width is gradually symmetrically increased from the bottom portion toward the top portion thereof and whose top edge providing a cutting edge of the cutter tip arcs with the center of curvature being located on the center line of the symmetry.

2 Claims, 3 Drawing Sheets

CIRCULAR SAW BLADE

BACKGROUND OF THE INVENTION

This invention relates generally to an improvement in a circular saw blade and, more specifically, to an improved cutter tip structure of the saw blade.

A circular saw generally includes a main body, a plurality of spaced apart gullets formed around the outer periphery of the main body, and a plurality of cutter tips secured to the periphery of the main body with each tip secured in juxtaposition to each gullet. There are two types of cutter teeth generally used for circular saw blades. One of them is of a type in which the cutter tips are set to form alternating left and right face bevels. The other is of a swage type in which the front or forward surface of each cutter tip is converged from the upper cutting edge toward its lower bottom portion.

FIG. 6 illustrates a plan view of one such swage type cutter tip designated generally as 10'. In the conventional swage type cutter tips 10', in which each cutting edge 11' is straight, the stress exerted against the cutting pressure $P_1$ acts on the cutting edge 11' in the direction perpendicular to the cutting edge line. Since the cutter tip 10' is downwardly and backwardly converged in shape, the stress in both sides of the cutting edge 11' is failed to be fully supported by a body 3' to which the tip 10' is secured. Therefore, if the saw blade is overloaded by, for example, engaging a hard article, the cutter tips tend to be broken or damaged. Another problem associated with the conventional swage set type cutter tips as shown in FIG. 6 is related to the lowering of the cutting force of the blade, which is caused because the entire cutting edge is simultaneously brought into contact with an article to be cut. As a result, there are caused vibration of the blade, twisting of the cutting edge and the like troubles, resulting in the failure to produce a uniform and smooth cut surface.

SUMMARY OF THE INVENTION

It is, therefore, an object of the present invention to provide an improved circular saw blade which is devoid of the drawbacks of the conventional saw blade.

It is a special object of the present invention to provide a circular saw blade which can withstand high load operation and can operate efficiently and in a stable manner and can produce cut articles with beautiful smooth cut surfaces.

In accomplishing the foregoing objects, there is provided in accordance with the present invention an improved circular saw blade which comprises a circular main body, and a plurality of circumferentially spaced cutter tips secured to the main body. The improvement includes the cutter tips each having a front surface whose width is gradually symmetrically increased from the bottom portion toward the top portion thereof and whose top edge providing a cutting edge of the cutter tip arcs with the center of curvature being located on the center line of the symmetry.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
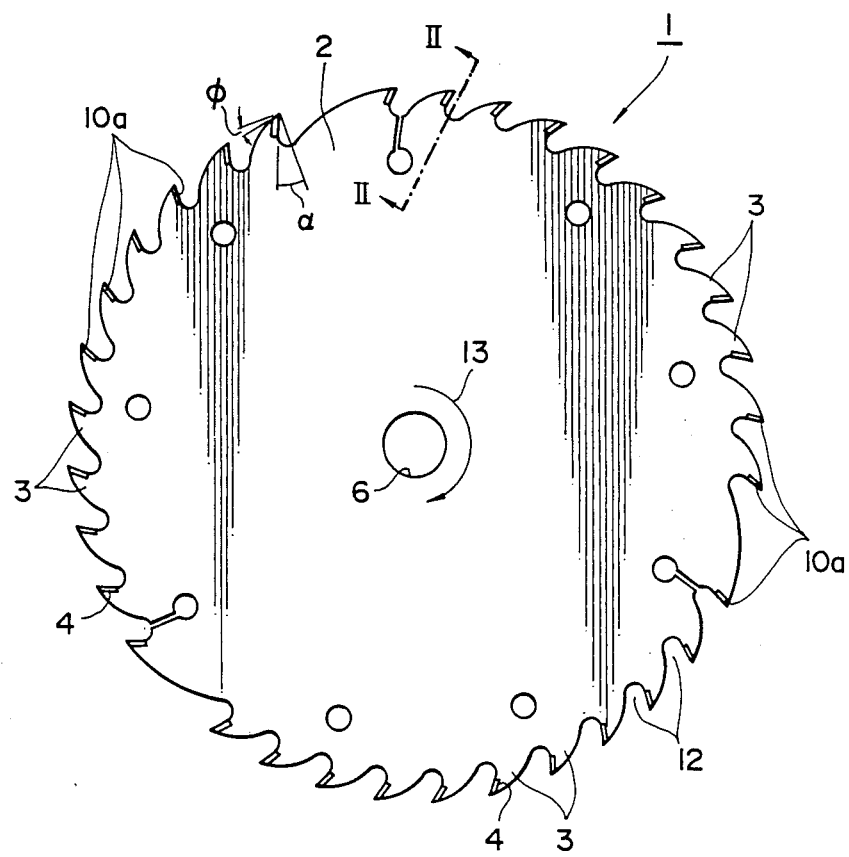
FIG. 1 is a side elevational view diagrammatically showing one embodiment of a circular saw blade according to the present invention.

Referring first to FIG. 1, designated generally as 1 is a circular saw blade according to the present invention. The saw blade 1 is composed of a substantially circular main body 2 having a plurality of outwardly projected cutter tip supporting portions 3 formed about the periphery of the main body 2. Between each adjacent supporting portions 3 is defined a gullet 12. Disposed in juxtaposition to each gullet 12 is a cutter tip 10a secured to a supporting face 4 of the supporting portion 3. The cutter tips 10a may be formed of a hardened material, such as super hard alloy, and the body 2 inclusive of the cutter tip supporting portions 3 may be composed of a material of lesser hardness, such as steel. The tips 10a may be secured to the support face 4 by a conventional brazing procedure. The main body 2 has a central bore 6 concentric with its center of rotation for mounting on the arbor of a saw.

Figure 2:
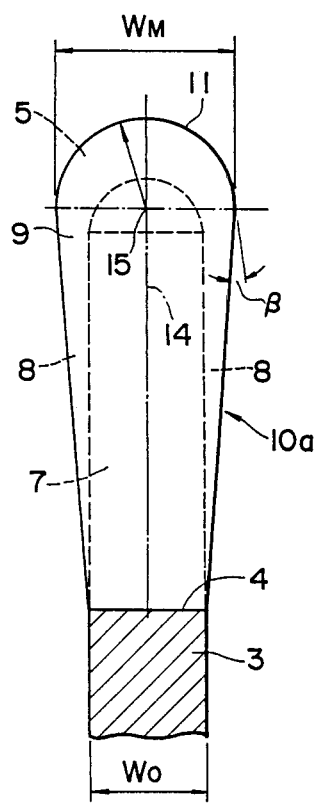
FIG. 2 is a fragmentary, enlarged, cross-sectional view taken along the line II—II in FIG. 1 showing the front view of the cutter tip.

Referring to FIG. 2, the cutter tip 10a has a rear surface 7 which is supportingly engaged by the support face 4 of the supporting portion 3 of the main body 2, and a front surface 9 which faces in the direction of rotation of the saw blade 1 during operation as indicated by the arrow 13 in FIG. 1. The tip 10a has opposing side surfaces 8 and an outer, top surface 5. Between the top suface 5 and the front surface 9 is provided a cutting edge 11.

The width of the front surface 9 is gradually symmetrically increased from the bottom portion toward the top, cutting edge 11. The maximum width $W_M$ of the front surface 9 is preferably 1.3 to 1.7 times the thickness $W_O$ of the main body 2 for reasons of preventing vibration and twisting of the cutting edge during operation.

The upper edge, i.e. cutting edge 11, of the front surface 9 arcs outwardly with the center 15 of curvature being located on the center line (line of symmetry) 14. In the specific embodiment shown, the center 15 is located at the cross point of the center line 14 and the line on which the width of the front surface 9 is maximum. Thus, when the maximum width $W_M$ is 3 mm, the radius of the arcked edge 11 is 1.5 mm. In this instance, the thickness of the main body 2 is preferably 1.7–2.3 mm.

Figure 3:
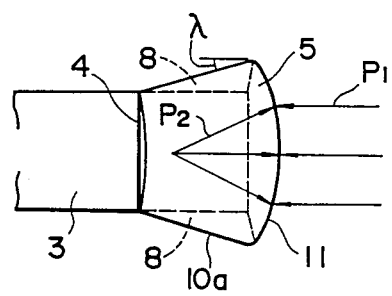
FIG. 3 is a top view of the cutter tip of FIG. 1.

As a result of the above structure, the cutting pressure $P_1$ acts on the arcked cutting edge 11 as shown in FIG. 3. The stress $P_2$ against the pressure $P_1$ is exerted from the center 15 of the arcked cutting edge 11 located on the center line 14. Therefore, substantially all of the stress $P_2$ can act on the cutting tip supporting portion 3 of the main body 2, minimizing the occurrence of breakage of the cutter tips 10a. In addition, the cutting edge 11 is brought into engagement with an article to be worked at its middle portion at the outset. The contact portion gradually spreads toward the both sides as the cutting operation proceeds. Therefore, cutting can be efficiently effected in a stable manner without encountering warp and twist of the saw blade. This contributes much to the production of worked articles with beautiful cut surfaces.

Figure 4:
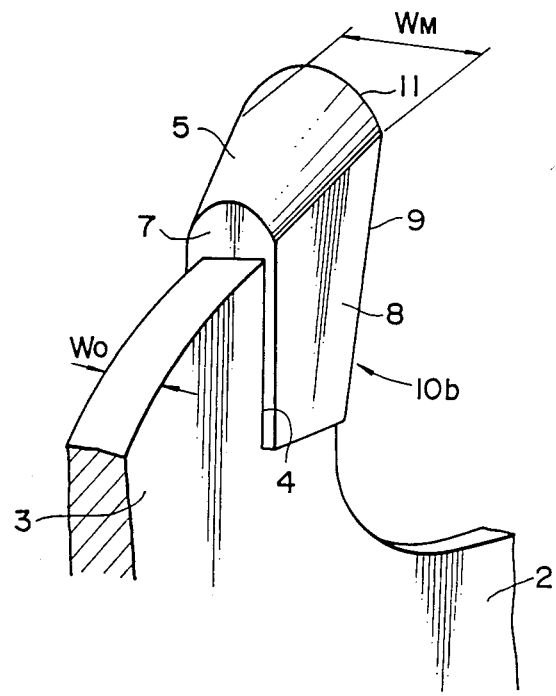
FIG. 4 is a fragmentary, perspective view showing another embodiment of cutter tip according to the present invention.
Figure 5:
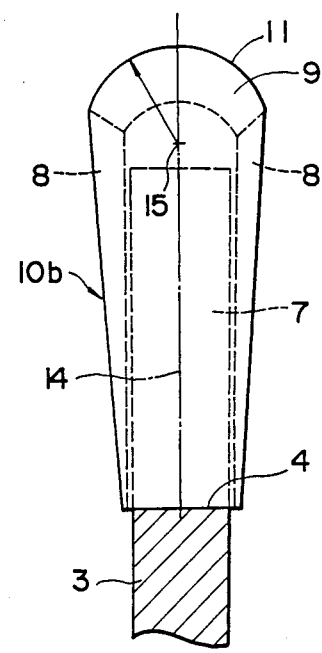
FIG. 5 is a cross-sectional view similar to FIG. 2 showing the front of the cutter tip of FIG. 4.
Figure 6:
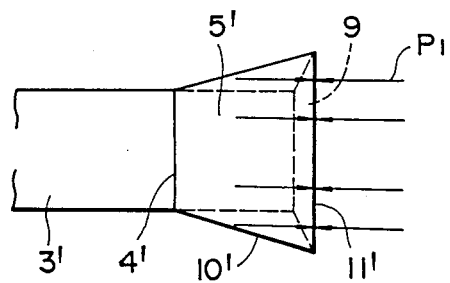
FIG. 6 is a fragmentary top view similar to FIG. 3 showing a conventional cutter tip.

FIG. 4 depicts another embodiment of the cutter tip structure according to the present invention, in which the same reference numerals designate similar component parts. In this embodiment, the radius of curvature of the cutting edge 11 is greater than the half of the maximum width of the front surface 9 of the cutter tip 10b. The main body 2 has a thickness smaller than the width of the rear surface 7 of the cutter tip 10b.

The cutter tip according to the present invention can be designed in any suitable form. Preferred design is as follows:

| | |
|---|---|
| Radius of the arcked cutting edge 11 | 3.5–5.5 mm |
| Hook angle ($\alpha$) | 18–22° |
| Clearance angle ($\phi$) | 14–16° |
| Side clearance angle ($\lambda$) | 2–5° |
| Radial clearance angle ($\beta$) | 1–2° |
| Face bevel angle | ±5° |
| Top bevel angle | 0° |

The invention may be embodied in other specific forms without departing the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A circular saw blade comprising a circular mean body, and a plurality of circumferentially spaced cutter tips secured to said main body, each of said cutter tips having a front surface whose width is gradually symmetrically increased from the bottom portion toward the top portion thereof and whose cutting edge arcs with the center of curvature being located on the center line of the symmetry, the center of curvature being located at a cross point of a center line on which the width of the front surface is maximum.

2. A circular saw blade according to claim 1, wherein the maximum width of said front surface is 1.3 to 1.7 times the thickness of said main body.

* * * * *